United States Patent
Lu et al.

(10) Patent No.: US 9,063,773 B2
(45) Date of Patent: Jun. 23, 2015

(54) AUTOMATIC PARALLELISM TUNING FOR APPLY PROCESSES

(71) Applicant: Oracle International Corporation, Redwood Shores, CA (US)

(72) Inventors: Edwina Ming-Yue Lu, Palo Alto, CA (US); Nimar Singh Arora, Union City, CA (US); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 139 days.

(21) Appl. No.: 13/949,594

(22) Filed: Jul. 24, 2013

(65) Prior Publication Data

US 2015/0033232 A1    Jan. 29, 2015

(51) Int. Cl.
*G06F 9/46* (2006.01)
*G06F 17/30* (2006.01)

(52) U.S. Cl.
CPC .......... *G06F 9/466* (2013.01); *G06F 17/30371* (2013.01)

(58) Field of Classification Search
CPC . G06F 17/30371; G06F 9/466; G06F 9/4843; G06F 9/5038
See application file for complete search history.

(56) References Cited

U.S. PATENT DOCUMENTS

| | | | |
|---|---|---|---|
| 6,708,179 B1* | 3/2004 | Arora | 1/1 |
| 6,889,231 B1* | 5/2005 | Souder et al. | 1/1 |
| 6,976,022 B2* | 12/2005 | Vemuri et al. | 1/1 |
| 7,260,575 B2* | 8/2007 | Dearing et al. | 707/704 |
| 7,523,143 B2* | 4/2009 | Wong et al. | 1/1 |
| 7,668,878 B2* | 2/2010 | Arora et al. | 707/610 |
| 7,702,741 B2* | 4/2010 | Yuan et al. | 709/208 |
| 7,783,601 B2* | 8/2010 | Wong et al. | 707/635 |
| 7,801,852 B2* | 9/2010 | Wong et al. | 707/615 |
| 8,032,885 B2* | 10/2011 | Fish | 718/101 |
| 8,280,917 B1* | 10/2012 | Wei et al. | 707/802 |
| 8,650,224 B2* | 2/2014 | Wei et al. | 707/802 |
| 8,707,310 B2* | 4/2014 | Upadhyaya et al. | 718/101 |

OTHER PUBLICATIONS

Suzak et al. "Two Dynamic Performance Tuning Methods for Portable Parallel Programs", 1995 IEEE, pp. 585-594.*

* cited by examiner

*Primary Examiner* — Van Nguyen
(74) *Attorney, Agent, or Firm* — Hickman Palermo Becker Bingham LLP; Ellen Y. Wei

(57) ABSTRACT

Techniques are provided for automatic parallelism tuning. At least one batch of change records is assigned to one or more apply processes in a set of active apply processes. A first throughput value is periodically determined based on a number of processed change records in a first time interval. An increment adjustment is periodically performed, including adding an additional apply process, determining a second throughput value, and removing the additional apply process from the set of active apply processes if the second throughput value is not greater than a previous first throughput value by at least an increment threshold. A decrement adjustment is periodically performed, including removing an apply process, determining a third throughput value, and replacing the removed apply process in the set of active apply processes if the third throughput value is not greater than the previous first throughput value by at least a decrement threshold.

20 Claims, 6 Drawing Sheets

AUTOMATIC PARALLELISM TUNING FOR APPLY PROCESSES

TECHNICAL FIELD

The present disclosure generally relates to computer systems, and, more specifically, to parallel apply processes.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers systems may be configured to store and retrieve large amounts of data. Typically, computer systems rely on database systems to perform this function. Replication is the process of replicating data from a source database onto another database system, herein referred to as a target database. One approach to replication is the physical standby approach. Under this approach, the changes made to data blocks on the source database are made to replicas of those data blocks on a target database. Because the source database is replicated at the lowest atomic level of storage space on the target database, the target database is a physical replica of the source database. Another approach to replicating data is the logical standby approach. Under the logical standby approach, change records corresponding to database commands executed on the source database are processed on the target database. While the changes are replicated at the record level, the changes are not replicated at the data block level.

Database systems may be configured to allow multiple concurrent sessions to execute transactions. For example, multiple concurrent sessions may execute transactions on a source database. When these source database transactions are replicated on a target database, the transactions may also be applied in parallel by multiple processes. However, because of dependencies between transactions and contention issues, performance does not automatically scale with the number of processes utilized to apply the source database transactions at the target database. Typically, the number of processes utilized to apply the source database transactions is determined based on the available resources at the source database.

Based on the foregoing, it is desirable to develop an approach that allows automatic parallelism tuning for apply processes.

DESCRIPTION OF EXAMPLE EMBODIMENTS

Figure 1:
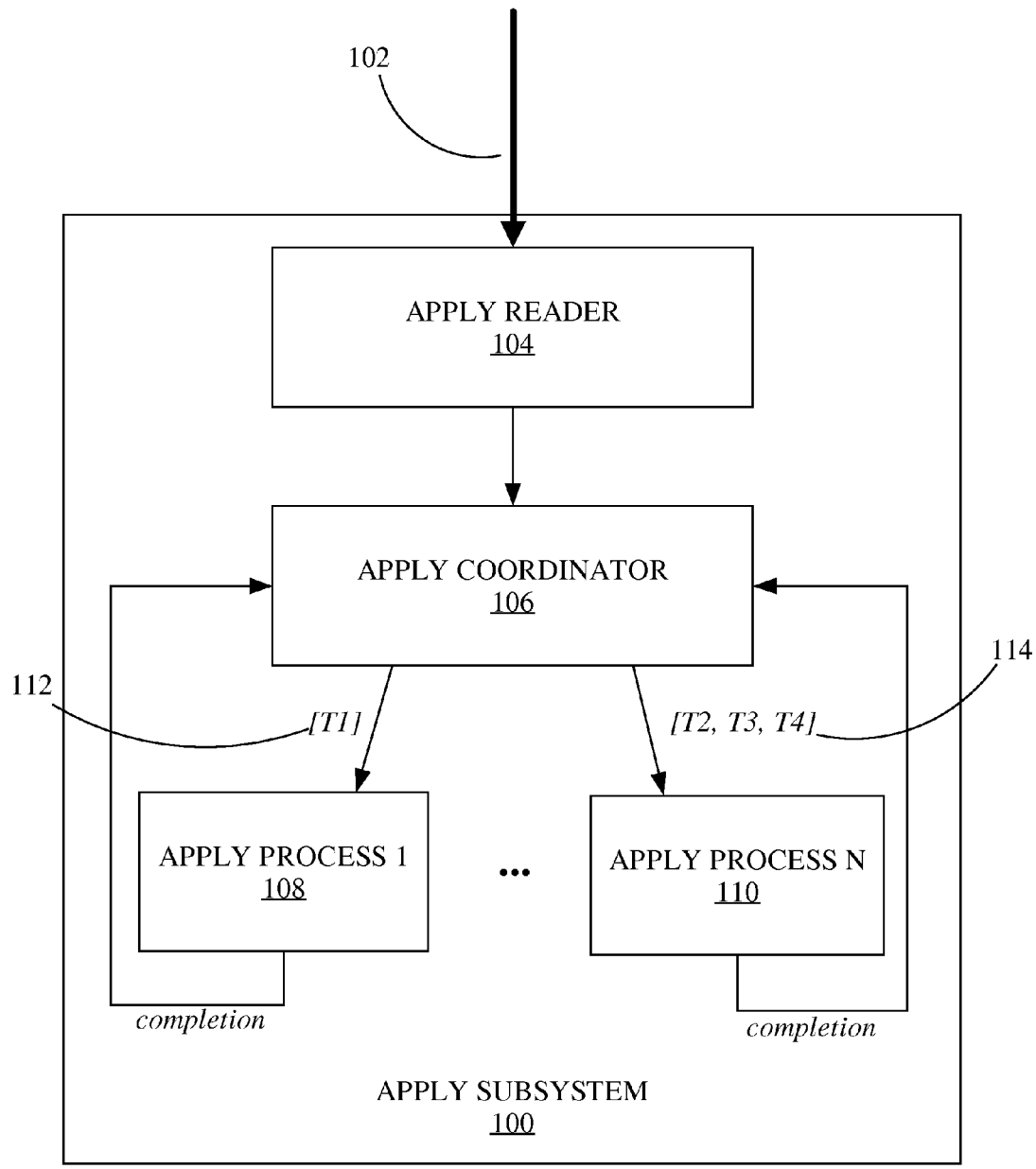
FIG. 1 is a block diagram depicting data flow in an embodiment of a database subsystem configured to apply transactions in parallel.

Automatic parallelism tuning for apply processes is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1. General Overview
2. Database Management Systems
3. Parallel Apply Processes
4. Throughput-based Parallelism Tuning
5. Example Parallelism States
6. Automatic Parallelism Tuning Process
7. Increment Adjustment Process
8. Decrement Adjustment Process
9. Implementation Mechanisms—Hardware Overview
10. Extensions and Alternatives
1. General Overview Techniques are described for automatic parallelism tuning for apply processes on computer systems, including database systems. A throughput-based approach dynamically determines the number of active apply processes to use in a system. As used herein, the term "apply process" refers to any process, thread, subsystem, application, or other concert configured to apply one or more changes, such as but not limited to change records corresponding to database transactions and/or database operations.

Depending on the nature of the transactions to be applied, the optimal number of apply processes may vary. For example, if the workload contains highly dependent transactions, then a smaller number of apply processes may be optimal. If the workload contains transactions that are primarily independent, and there are sufficient resources on the destination database, then a higher number of apply processes may provide better performance.

An initial throughput is determined based on a number of change records processed by the active apply processes over a period of time. The number of active apply processes is adjusted, and a new throughput is determined. If the new throughput is sufficiently greater than the initial throughput, then the new number of active apply processes is maintained.

The throughput-based approach can dynamically adjust to many variables and metrics, including but not limited to available CPU, available memory, other available resources, workload size, contention in the workload, any other metrics that may affect throughput. Furthermore, when these variables and metrics change, the number of apply processes is dynamically adjustable. This approach increases performance and scalability for parallel workload processing, including applying database transactions in parallel. In one embodiment, automatic parallelism tuning is provided for database replication.

2. Database Management Systems

Embodiments described herein may be used in the context of database management systems (DBMSs). A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client that interact with a database server.

A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. For instance, CREATE, ALTER, DROP, and RENAME, are common examples of DDL instructions found in some SQL implementations. SQL data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Performing operations within a database server often entails invoking multiple layers of software. A layer is set of software modules that perform a functionality that has been dedicated, to an extent, within a database server to the set of software modules. Executing an operation typically involves calling multiple layers of software, with one layer making a call to another layer, which during the execution of the first call, calls another layer. For example, to execute an SQL statement, an SQL layer is invoked. A client, such as a replication client, typically accesses the database via a database command to the database server, such as in the form of a SQL statement. Alternatively and/or in addition, a database server may manage one or more aspects of replication in a manner that bypasses the SQL layer.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions. Typically, database commands are executed over a synchronous connection to the database.

3. Parallel Apply Processes

Parallel apply processes may be used to apply one or more transactions to a database. For example, in a replication system, parallel apply processes may be used to apply one or more source database transactions to a target database.

FIG. 1 is a block diagram depicting data flow in an embodiment of a database subsystem configured to apply transactions in parallel. Apply subsystem 100 includes apply reader 104. Apply reader 104 is configured to obtain replication data. For example, apply reader 104 may be configured to read replication data from a file, a network location, or other stored replication data. In one embodiment, apply reader 104 is configured to receive replication data over one or more data streams 102.

The replication data contains change records that describe operations and/or transactions performed on a source database. The replication data may include one or more change records. A change record may include data showing the difference between an existing record and the new record. For example, the change records may be logical change records (LCRs) that represent source database Data Manipulation Language (DML) transactions or Data Definition Language (DDL) transactions. In one embodiment, the replication data includes all transactions performed on the source database in committed order. Alternatively or in addition, the replication data may include one or more interleaved transactions. In one embodiment, data stream/s 102 includes one or more asynchronous streams.

Apply subsystem 100 further includes apply coordinator 106. Apply coordinator 106 is configured to schedule the processing of transactions by a set of active apply processes 108-110. Active apply processes 108-110 may include one or more threads, processes, applications and/or servers.

Apply coordinator 106 may be configured to determine the number of active apply processes 108-110. In one embodiment, an initial number of active apply processes may be set, specified, and/or calculated based on one or more factors. When the number of active apply processes is set to 1, serial transaction processing is carried out by one active apply process.

To determine the number of active apply processes 108-110, apply coordinator 106 may calculate throughput values for a given period of time. In one embodiment, one or more throughput values is determined based on N intermediate throughput values, where N is an integer greater than 1. The N intermediate throughput values are determined based on a number of processed change records over each of N time intervals. Apply coordinator 106 may further calculate the mean, variance and/or standard deviation of the throughput. Another component of apply subsystem 100 may also be configured to determine the number of active apply processes 108-110. The determination of the number of active apply processes is further detailed at FIGS. 2-6.

One or more of apply processes may be an inactive apply process. Typically, creating and destroying processes requires overhead cost. At least some of these costs may be avoided by leaving one or more apply processes in an inactive state. For example, an inactive apply process may be assigned no change records to process while maintaining a session. Such an inactive apply process can be activated without establishing a new session. In one embodiment, apply coordinator 106 manages the active/inactive state of available apply processes and assigns change records to active apply processes 108-110.

An active apply process may be added to the set of active apply processes 108-110 by restoring an inactive apply process to an active state. When an active apply process is removed from the set of active apply processes 108-110, an active apply process may be inactivated. By keeping one or more inactive apply processes, creating and/or destroying apply processes can be at least partially avoided.

In one embodiment, apply coordinator 106 is configured to determine at least one batch 112-114 comprising change records for at least one transaction received by apply reader 104. Apply coordinator 106 assigns a batch 112-114 to each active apply process 108-110. Each batch 112-114 includes change records corresponding to at least one transaction $T_i$ received by apply reader 104. In one embodiment, batch 112-114 may include either a single transaction (e.g. batch 112) or multiple transactions (e.g. batch 114). In one embodiment, transactions in the same batch are consecutive (e.g. $T_i$, $T_{i+1}, \ldots T_{i+k}$). Alternatively or in addition, transactions in the same batch may include non-consecutive transactions.

Each active apply process 108-110 is configured to process a batch 112-114 assigned by apply coordinator 106. To process a batch, active apply processes 108-110 execute the changes contained in the change records on the target database. Active apply processes 108-110 may reorder one or more change records in the batch or otherwise process the batch of change records. When active apply processes 108-110 finish processing an assigned batch 112-114, active apply processes 108-110 notify apply coordinator 106 that processing is complete for the transactions included in the batch.

When applying a batch of transactions, active apply processes 108-110 may use dependency data to determine whether a transaction may be executed without violating an inter-transaction dependency. As used herein, the term "inter-transaction dependency" refers to a dependency of a transaction on one or more other transactions. To satisfy a dependency, the one or more other transactions must be committed before the dependent transaction is executed. As used herein, the term "intra-transaction dependency" refers to a dependency of a change record on one or more other change records within a batch of one or more transactions.

When a workload includes database transactions with a high level of inter-transaction dependencies, the usage of additional active apply processes 108-110 may cause increased wait time by active apply processes 108-110. When a workload includes database transactions with a high level of intra-transaction dependencies and/or a wide variety of operation types, array operations may not generate the same efficiencies.

In one embodiment, apply subsystem 100 is a subsystem of a replication client. In one embodiment, the replication client does not have direct access to the source database. However, the replication client may be a module of the target database server and/or may share one or more computing resources with the target database server. Alternatively and/or in addition, the replication client may communicate with the target database server over a network. The replication client may interact with the target database by submitting database commands to the database server. Typically, the database commands are issued over a synchronous connection with the database server. For example, a replication client may construct and issue SQL queries to the database system to make changes to the data. In this case, active apply processes 108-110 are processes within the replication client.

In one embodiment, apply subsystem 100 is a subsystem of a database server. In this case, data stream 102 may be transmitted by a replication client. In one embodiment, the replication client and apply subsystem 110 are integrated to bypass a public interface and the associated layer of the target database server (e.g. the SQL interface and the SQL layer) by asynchronously streaming change records to the database server over data stream 102. In this case, active apply processes 108-110 are processes within the target database server.

4. Throughput-Based Parallelism Tuning

The number of active apply processes used to apply changes in a system is determined by comparing throughput values before and after adjusting the number of active apply processes. Throughput values are determined based on a number of change records processed by the active apply processes in one or more time intervals.

The number of processed change records will depend on the method of counting. For example, the number of processed change records used to determine throughput values may be the number of change records applied by the active apply processes (e.g. the number of change records applied by apply processes 108-110), the number of change records assigned to the active apply processes (e.g. the number of change records assigned to apply processes 108-110 by apply coordinator 106), the number of change records contained in transactions applied by the active apply processes (e.g. the number of change records contained in transactions applied by apply processes 108-110), the number of change records contained in transactions assigned to the active apply processes (e.g. the number of change records contained in transactions assigned by apply coordinator 106), a data size of assigned or applied change records or transactions, or any other metric related to throughput of change records.

In one embodiment, one or more throughput values are determined based on N intermediate throughput values, where N is an integer greater than 1. The N intermediate throughput values are determined based on a number of processed change records over each of N time intervals. For example, the throughput value may be the mean of the N throughput values associated with each of the N time intervals. The number of time intervals N may be set, specified, and/or calculated based on one or more factors. Furthermore, the number of time intervals N may be the same or different for each throughput value. In one embodiment, the length of each time interval key is set, specified, and/or calculated based on one or more factors. Furthermore, the length of each time interval may be the same or different for each throughput value and/or intermediate throughput value. If the length of any time interval differs, the length of the time intervals may be normalized, such as by calculating a rate over time for the throughput values.

A throughput value may be calculated for an initial state, a neutral state, or any other state before an adjustment is made to the number of active apply processes. After an adjustment is made to the number of active apply processes, a new throughput value is determined for the new number of active apply processes, and the previous throughput value is compared to the new throughput value. In one embodiment, N intermediate throughput values are used to calculate a throughput value for an initial state, a neutral state, or any other state before an adjustment is made to the number of active apply processes. By calculating a throughput value based on N intermediate throughput values before the adjustment, performance after the adjustment may be compared to a more stable indicator of performance before the adjustment. In one embodiment, the mean, variance and/or standard deviation of one or more intermediate throughput values may calculated. For example, the mean, variance and/or standard deviation may be used to determine one or more thresholds for comparing throughput.

When the previous throughput value is compared to the new throughput value after the adjustment, one or more rules may be used to determine if the adjusted number of active apply processes is preferable to the number of active apply processes before the adjustment. In one embodiment, if the new throughput value is greater than the previous throughput value by at least a threshold, the new number of active apply processes is considered favorable, and the new number of active apply processes is retained. In one embodiment, if the threshold is not satisfied, i.e. the new threshold value is not greater than the previous threshold value by at least the threshold, the original number of active apply processes is restored.

In one embodiment, the number of active apply processes is incremented or decremented by one. An increment adjustment involves adding one or more active apply processes to the set of active apply processes. A decrement adjustment involves removing one or more active apply processes from the set of active apply processes. The threshold value may be the same or different for an increment adjustment and a decrement adjustment.

An increment threshold may be based on the variance and/or standard deviation of one or more intermediate threshold values used to calculate the previous throughput value. For example, the increment threshold may be set to two times the standard deviation of N intermediate throughput values for N intermediate time intervals, where N is an integer greater than 1, and where the previous throughput value is the mean of the N intermediate throughput values. In this case, if the new threshold value is greater than the previous throughput value (i.e. the mean of N intermediate throughput values) by at least two times the standard deviation of the N intermediate throughput values, the addition of the active apply process in the increment adjustment is considered favorable. In one embodiment, when the new threshold value is not greater than the previous throughput value by at least the increment threshold, the added active apply process is removed from the set of active apply processes.

In one embodiment, a decrement threshold may be set to zero. In this case, if the new threshold value is greater than the previous throughput value, the removal of an active apply process in the decrement adjustment is considered favorable. In one embodiment, when the new threshold value is not greater than the previous throughput value by at least a decrement threshold, the removed active apply process is restored to the set of active apply processes.

Adjustments, such as increment adjustments and decrement adjustments, may be periodically performed. Alternatively and/or in addition, performance of an increment adjustment may depend on satisfaction of an increment condition. For example, an increment condition may be the elapsing of a period of time, the satisfaction of an increment threshold, the non-satisfaction of a decrement threshold, or any other condition indicating that performing an increment adjustment may be appropriate. Alternatively and/or in addition, performance of a decrement adjustment may depend on satisfaction of a decrement condition. For example, a decrement condition may be the elapsing of a period of time, the satisfaction of a decrement threshold, the non-satisfaction of an increment threshold, or any other condition indicating that performing a decrement adjustment may be appropriate.

5. Example Parallelism States

A set of states may be used to conceptually describe automatic parallelism tuning. For example, the example process states shown in FIG. 2 and FIG. 3 illustrate that increment adjustments and decrement adjustments are periodically performed, that the periodic performance of an increment adjustment may depend on satisfaction of an increment condition, and that the periodic performance of a decrement adjustment may depend on satisfaction of the decrement condition.

Although automatic parallelism tuning may be implemented using one or more states and/or state engine design, any other logic and/or process flow may be used to implement automatic parallelism tuning.

Figure 2:
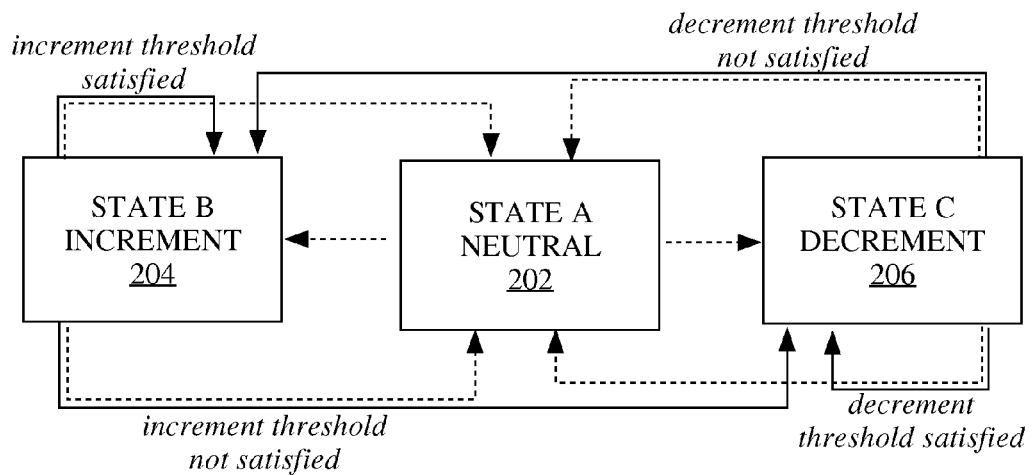
FIG. 2 is a block diagram depicting an embodiment of process states for automatic parallelism tuning for apply processes.
Figure 3:
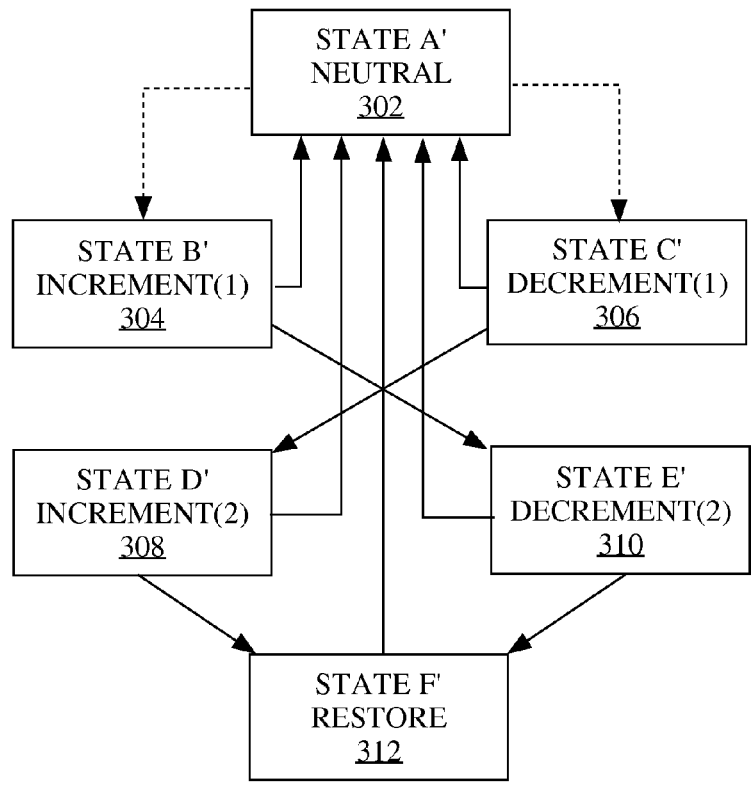
FIG. 3 is a block diagram depicting an embodiment of process states for automatic parallelism tuning for apply processes.

FIG. 2 is a block diagram depicting an embodiment of process states for automatic parallelism tuning for apply processes. State A 202 is a neutral state. In one embodiment, State A 202 is the initial state. An initial number of active apply processes may be set, specified, and/or calculated based on one or more factors. In State A 202, a throughput value TV(A) is determined for the active apply processes.

TV(A) is determined based on a number of change records processed by the active apply processes in one or more time intervals. The number of processed change records will depend on the method of counting. For example, the number of processed change records used to determine TV(A) may be the number of change records applied by the active apply processes, the number of change records assigned to the active apply processes, the number of change records contained in transactions applied by the active apply processes, the number of change records contained in transactions assigned to the active apply processes, a data size of assigned or applied change records or transactions, or any other metric related to throughput of change records.

In one embodiment, TV(A) is determined based on N throughput values determined based on a number of processed change records over each of N time intervals, where N is an integer greater than 1. For example, TV(A) may be the mean of the N throughput values associated with each of the N time intervals. The number of time intervals N may be set, specified, and/or calculated based on one or more factors. Furthermore, the number of time intervals N may be the same or different each time TV(A) is determined in State A 202.

In one embodiment, the mean, variance and/or standard deviation of processed change records is determined for the N time intervals. One or more of an increment threshold and the decrement threshold may be calculated based on the mean, variance and/or standard deviation of the number of processed change records over the N time intervals.

After TV(A) is determined for State A 202, processing may continue to State B 204 or State C 206. In one embodiment, one of State B 204 and State C 206 is selected such that the selected state always follows State A 202. Alternatively and/or in addition, either State B 204 or State C 206 may be randomly selected to follow State A 202.

State B 204 is configured to perform an increment adjustment. In State B 204, an additional apply process is added to the set of active apply processes. Additionally, a throughput value TV(B) is determined based on a number of processed change records in one or more time intervals. In one embodiment where more than one time interval is used to determine TV(B), TV(B) is the mean of throughput values associated with each of the time intervals. If TV(B) is greater than a previous throughput value by at least an increment threshold, the addition of the apply process is considered favorable, and the additional apply processes retained. Otherwise, the additional apply process is removed from the set of active apply processes, i.e. if TV(B) is not greater than the previous throughput value by at least the increment threshold. In one embodiment, the increment threshold is two times the standard deviation of N intermediate throughput values used to calculate the previous throughput value, where the previous throughput value is the mean of the N intermediate throughput values.

In one embodiment, after processing is complete in State B 204, processing continues to State A 202 regardless of whether the increment threshold is satisfied by TV(B), i.e. whether TV(B) is greater than the previous throughput value by at least the increment threshold. Alternatively or in addition, the next state may be determined based on whether the increment threshold is satisfied by TV(B): if the increment threshold is satisfied, processing continues to State B 204; otherwise, the increment threshold is not satisfied, and processing continues to State C 206. When State B 204 is configured in this manner, increment adjustments will continue to be made in State B 204 until the increment threshold is not satisfied by the addition of another active apply process. In this case, one or more throughput values and/or threshold values may be updated to reflect the current number of active apply processes.

State C 206 is configured to perform a decrement adjustment. In State C 206, an apply process is removed from the set of active apply processes. An active apply process may be removed from the set of active apply processes by inactivating an active apply process. Additionally, a throughput value TV(C) is determined based on a number of processed change record in one or more time intervals. In one embodiment where more than one time interval is used to determine TV(C), TV(C) is the mean of throughput values associated with each of the time intervals. If TV(C) is greater than a previous throughput value by at least a decrement threshold, then the removal of the apply process is configured favorable. Otherwise, the removed apply process is replaced by adding an apply process to the set of active apply processes i.e. if TV(B) is not greater than the previous throughput value by at least the decrement threshold.

In one embodiment, after processing is complete in State C 206, processing continues to State A 202 regardless of whether the decrement threshold is satisfied by TV(C), i.e. whether TV(C) is greater than the previous throughput value by at least the decrement threshold. Alternatively or in addition, the next state may be determined based on whether the decrement threshold is satisfied by TV(C): if the decrement threshold is satisfied, processing continues to State C 206; otherwise, the decrement threshold is not satisfied, and processing continues to State B 204. When State C 206 is configured in this manner, decrement adjustments will continue to be made in State C 206 until the decrement threshold is not satisfied by the removal of another active apply process. In this case, one or more throughput values and/or threshold values may be updated to reflect the current number of active apply processes.

In one embodiment, if processing continues to the same state, such as from State B 204 to State B 204 or from State C 206 to State C 206, a new pre-adjustment throughput value TV* is determined based on N* intermediate throughput values determined based on a number of processed change records over each of N* intermediate time intervals, where N* is an integer greater than 1. For example, TV* may be the mean of the N* intermediate throughput values associated with each of the N* intermediate time intervals. The number of intermediate time intervals N* may be set, specified, and/or calculated based on one or more factors. A new increment threshold and/or decrement threshold may also be calculated based on the N* intermediate throughput values. In one embodiment, a new increment threshold is determined as two times the standard deviation of the N* intermediate throughput values used to calculate the previous throughput value, where TV* is the mean of the N* intermediate throughput values.

FIG. 3 is a block diagram depicting an embodiment of process states for automatic parallelism tuning for apply processes. State A' 302 is a neutral state. The number of active apply processes in State A' 302 is X. X may be set to the current number of active apply processes every time State B' 304 is entered. In one embodiment, State A' 302 is the initial state. An initial number of active apply processes may be set, specified, and/or calculated based on one or more factors. In State A' 302, a throughput value TV(A') is determined for the active apply processes. In one embodiment, TV(A') is determined based on N throughput values determined based on a number of processed change records over each of N time intervals, where N is an integer greater than 1. For example, TV(A') may be the mean of the N throughput values associated with each of the N time intervals. The number of time intervals N may be set, specified, and/or calculated based on one or more factors. Furthermore, the number of time intervals N may be the same or different each time TV(A') is determined in State A' 302.

After TV(A') is determined for State A' 302, processing may continue to State B' 304 or State C' 306. In one embodiment, one of State B' 304 and State C' 306 is selected such that the selected state always follows State A' 302. Alternatively and/or in addition, either State B' 304 or State C' 306 is randomly selected to follow State A' 302.

State B' 304 is configured to perform an increment adjustment of 1. In State B' 304, one additional apply process is added to the set of active apply processes. The number of active apply processes is now X+1. A throughput value TV(B') is determined based on a number of processed change records in one or more time intervals. In one embodiment where more than one time interval is used to determine TV(B'), TV(B') is the mean of throughput values associated with each of the time intervals. If TV(B') is greater than a previous throughput value by at least an increment threshold, the current number of active apply processes, X+1, is considered favorable, and processing returns to State A' 302. Otherwise, processing continues to State E' 310.

State E' 310 is configured to perform a decrement adjustment of 2. State E' 310 is only entered after an increment adjustment of 1 in State B' 304 that did not satisfy the increment threshold. In State E' 310, two apply processes are removed from the set of active apply processes. The number of active apply processes is now X−1. A throughput value TV(E') is determined based on a number of processed change records in one or more time intervals. In one embodiment where more than one time interval is used to determine TV(E'), TV(E') is the mean of throughput values associated with each of the time intervals. If TV(E') is greater than a previous throughput value by at least a decrement threshold, the current number of active apply processes, X−1, is considered favorable, and processing returns to State A' 302. Otherwise, processing continues to State F' 312.

State F' 312 is configured to restore the original number of active apply processes X at the last visit to State A' 302. State F' 312 is only entered after testing X+1 active apply processes without satisfying the increment threshold and after testing X−1 active apply processes without satisfying the decrement threshold. After restoring the original number of active apply processes X, processing returns to State A' 302.

State C' 306 is configured to perform a decrement adjustment of 1. In State C' 306, one apply process is removed from the set of active apply processes. The number of active apply processes is now X−1. A throughput value TV(C') is determined based on a number of processed change records in one or more time intervals. In one embodiment where more than one time interval is used to determine TV(C'), TV(C') is the mean of throughput values associated with each of the time intervals. If TV(C') is greater than a previous throughput value by at least a decrement threshold, the current number of active apply processes, X−1, is considered favorable, and processing returns to State A' 302. Otherwise, processing continues to State D' 308.

State D' 308 is configured to perform an increment adjustment of 2. State D' 308 is only entered after a decrement adjustment of 1 in State C' 306 that did not satisfy the decrement threshold. In State E' 310, two apply processes are added to the set of active apply processes. The number of active apply processes is now X+1. A throughput value TV(D') is determined based on a number of processed change records in one or more time intervals. In one embodiment where more than one time interval is used to determine TV(D'), TV(D') is the mean of throughput values associated with each of the time intervals. If TV(D') is greater than a previous throughput value by at least an increment threshold, the current number of active apply processes, X+1, is considered favorable, and processing returns to State A' 302. Otherwise, processing continues to State F' 312.

6. Automatic Parallelism Tuning Process

Figure 4:
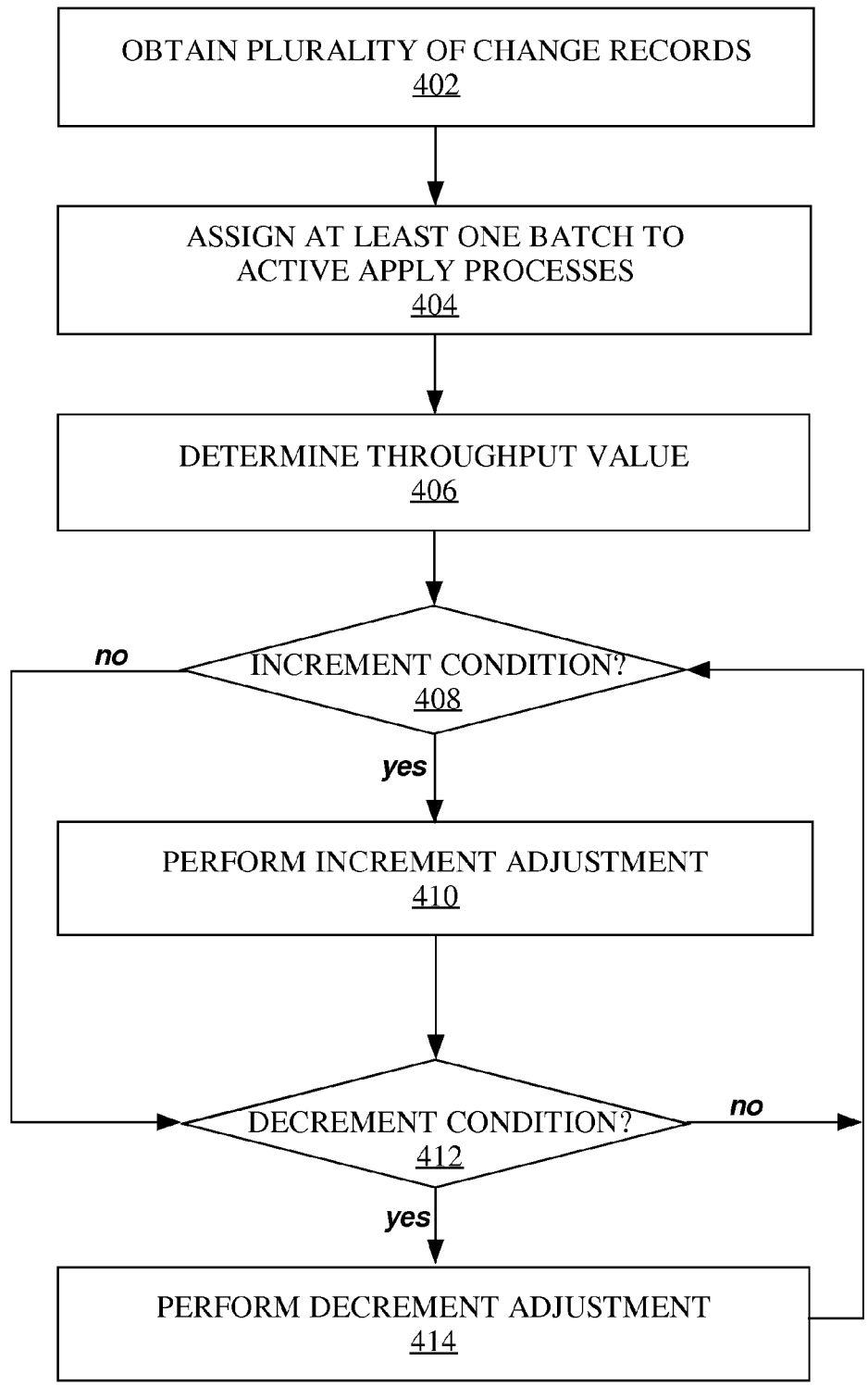
FIG. 4 is a flowchart illustrating an embodiment of a method for automatic parallelism tuning for apply processes.

FIG. 4 is a flowchart illustrating an embodiment of a method for automatic parallelism tuning for apply processes. In one embodiment, the method is performed by an apply subsystem for applying database transactions, such as apply subsystem 100. For example, the method may be performed by a subsystem of a replication client and/or a subsystem of a database server. The method may be performed to implement automatic parallelism tuning for database replication.

At block 402, a plurality of change records is obtained. For example, apply reader 104 or another component of replication subsystem 100 may obtain replication data containing the plurality of change records. The plurality of change records may be obtained from a file, a network location, or other stored replication data. In one embodiment, the plurality of change records are received over one or more data streams, such as data stream 102.

At block 404, at least one batch of change records is assigned to one or more apply processes in a set of active apply processes. For example, apply coordinator 106 or another component of replication subsystem 100 may assign at least one batch of change records to active apply processes 108-110.

At block 406, a throughput value is determined. The throughput value may be based on a number of processed change records in one or more time intervals. For example, the number of processed change records used to determine throughput values may be the number of change records applied by the active apply processes, the number of change records assigned to the active apply processes, the number of change records contained in transactions applied by the active apply processes, the number of change records contained in transactions assigned to the active apply processes, a data size of assigned or applied change records or transactions, or any other metric related to throughput of change records.

In one embodiment, the throughput value is determined based on N intermediate throughput values determined based on a number of processed change records over each of N time intervals, where N is an integer greater than 1. For example, the throughput value may be the mean of the N intermediate throughput values associated with each of the N time intervals. The number of time intervals N may be set, specified, and/or calculated based on one or more factors.

At decision block 408, it is determined whether an increment condition has occurred. If an increment condition has occurred, processing continues to block 410. Otherwise, processing continues to decision block 412. An increment condition is any condition that indicates performing an increment adjustment is desired. For example, an increment condition may be the elapsing of a period of time, the satisfaction of an increment threshold, the non-satisfaction of a decrement threshold, or any other condition indicating that performing an increment adjustment is desired. In one embodiment, checking for the increment condition at decision block 408 is optional, and processing always continues to block 410 in a periodic manner.

At block 410, an increment adjustment is performed. In one or more embodiments, the increment adjustment is performed periodically. An embodiment of a method for performing an increment adjustment is described in more detail at FIG. 5.

At decision block 412, it is determined whether a decrement condition has occurred. If a decrement condition has occurred, processing continues to block 414. Otherwise, processing continues to decision block 408. A decrement condition is any condition that indicates performing a decrement adjustment is desired. For example, a decrement condition may be the elapsing of a period of time, the satisfaction of a decrement threshold, the non-satisfaction of an increment threshold, or any other condition indicating that performing a decrement adjustment is desired. In one embodiment, checking for the decrement condition at decision block 412 is optional, and processing always continues to block 414 in a periodic manner.

At block 414, a decrement adjustment is performed. In one or more embodiments, the decrement adjustment is performed periodically. An embodiment of a method for performing a decrement adjustment is described in more detail at FIG. 6.

7. Increment Adjustment Process

Figure 5:
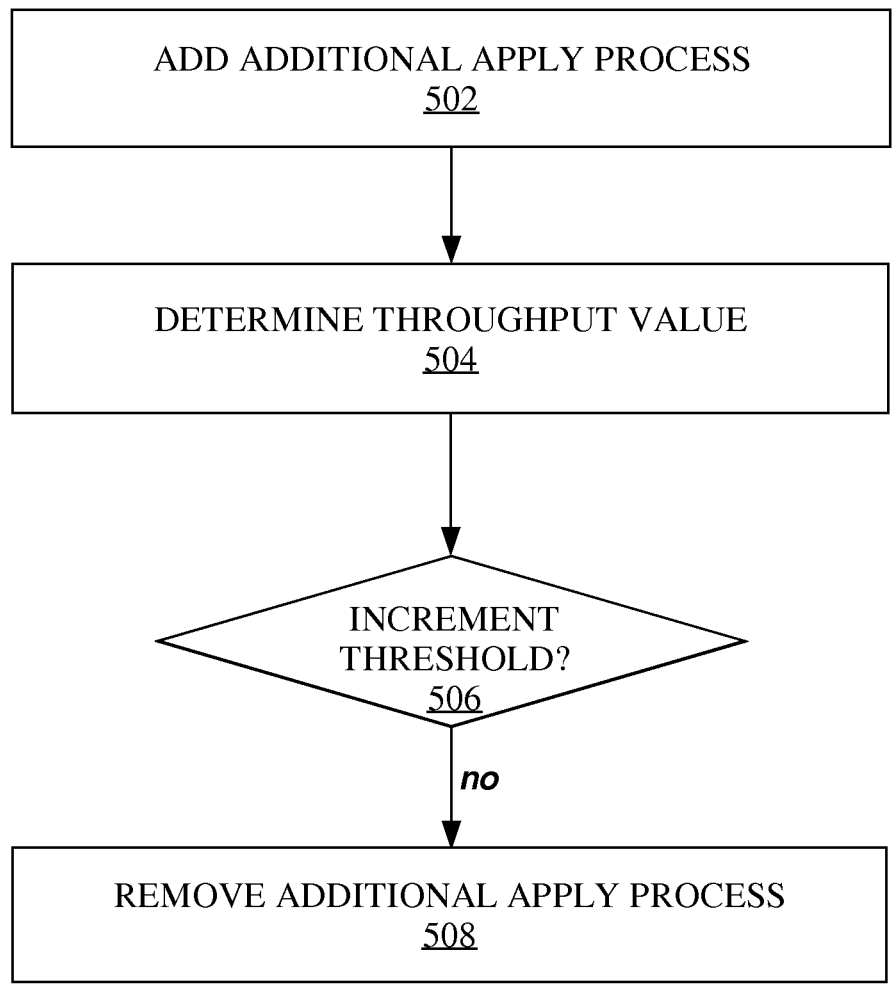
FIG. 5 is a flowchart illustrating an embodiment of a method for performing an increment adjustment.

FIG. 5 is a flowchart illustrating an embodiment of a method for performing an increment adjustment. For example, the method may be performed at block 410 of the method shown in FIG. 4. In one embodiment, the method is performed by an apply subsystem for applying database transactions, such as apply subsystem 100. The method may be performed by a subsystem of a replication client and/or a subsystem of a database server.

At block 502, an additional apply process is added to the set of active apply processes. For example, apply coordinator 106 or another component of replication subsystem 100 may add the apply process to the set of active apply processes 108-110, such as by creating an apply process or activating an inactive apply process. An active apply process may be added to the set of active apply processes by restoring an inactive apply process to an active state.

At block 504, a throughput value is determined based on a number of processed change records in one or more time intervals. For example, apply coordinator 106 or another component of replication subsystem 100 may determine the throughput value. The number of processed change records used to determine the throughput value may be the number of change records applied by the active apply processes, the number of change records assigned to the active apply processes, the number of change records contained in transactions applied by the active apply processes, the number of change records contained in transactions assigned to the active apply processes, a data size of assigned or applied change records or transactions, or any other metric related to throughput of change records.

At decision block 506, it is determined whether the throughput value is greater than a previous throughput value by at least an increment threshold. If the throughput value is greater than a previous throughput value by at least the increment threshold, the additional apply process added at block 502 is retained, and no additional processing is required. If the throughput value is not greater than a previous throughput value by at least the increment threshold, processing continues to block 508.

At block 508, the additional apply process is removed from the set of active apply processes. Block 508 is reached when the additional apply process added at block 502 did not increase throughput by the increment threshold. To remove the additional apply process, any apply process may be removed from the set of active apply processes to restore the original number of active apply processes at the beginning of the increment adjustment. In one embodiment, an active apply process is removed by inactivating an active apply process rather than destroying the apply process.

8. Decrement Adjustment Process

Figure 6:
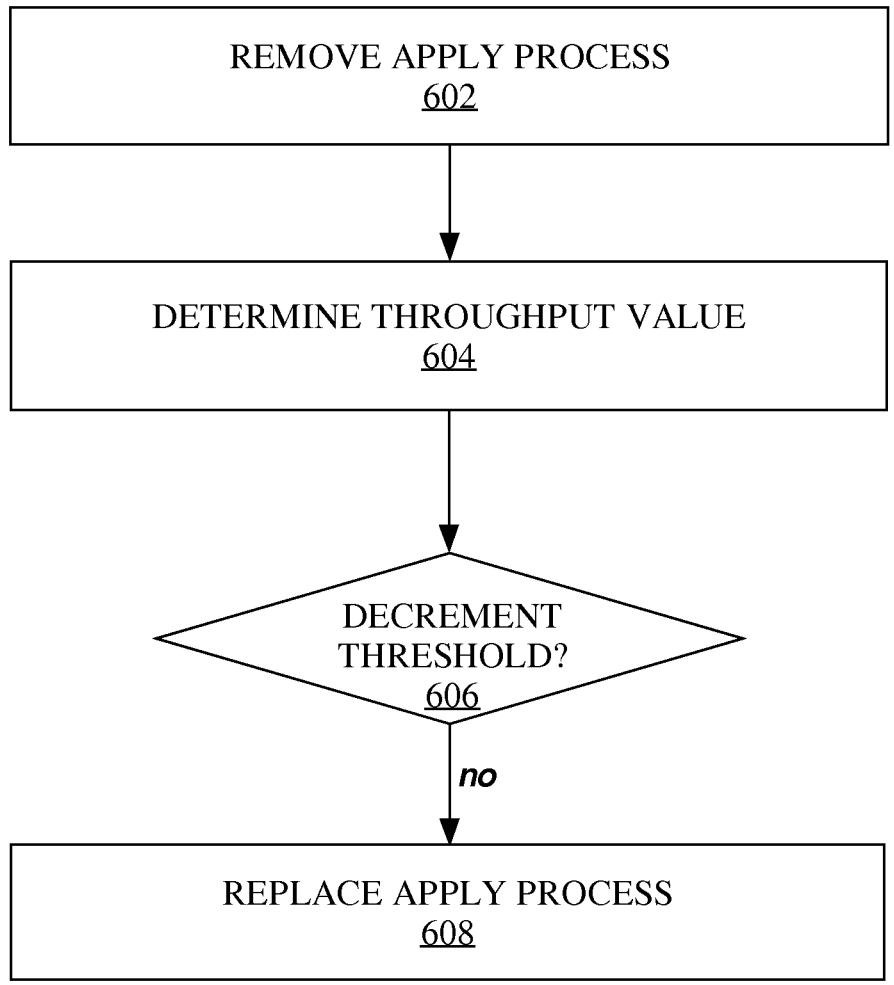
FIG. 6 is a flowchart illustrating an embodiment of a method for performing a decrement adjustment.

FIG. 6 is a flowchart illustrating an embodiment of a method for performing a decrement adjustment. For example, the method may be performed at block 414 of the method shown in FIG. 4. In one embodiment, the method is performed by an apply subsystem for applying database transactions, such as apply subsystem 100. The method may be performed by a subsystem of a replication client and/or a subsystem of a database server.

At block 602, an apply process is removed from the set of active apply processes. To remove the apply process, any apply process may be removed from the set of active apply processes. For example, apply coordinator 106 or another component of replication subsystem 100 may remove an apply process from the set of active apply processes 108-110, such as by destroying or inactivating an active apply process.

At block 604, a throughput value is determined. For example, apply coordinator 106 or another component of replication subsystem 100 may determine the throughput value. The number of processed change records used to determine the throughput value may be the number of change records applied by the active apply processes, the number of change records assigned to the active apply processes, the number of change records contained in transactions applied by the active apply processes, the number of change records contained in transactions assigned to the active apply processes, a data size of assigned or applied change records or transactions, or any other metric related to throughput of change records.

At decision block 606, it is determined whether the throughput value is greater than a previous throughput value by at least a decrement threshold. If the throughput value is greater than a previous throughput value by at least the decrement threshold, no additional processing is required. If the throughput value is not greater than a previous throughput value by at least the decrement threshold, processing continues to block 608.

At block 608, the removed apply process is replaced in the set of active apply processes. Block 608 is reached when the apply process removed at block 602 did not increase throughput by the decrement threshold. In one embodiment, the removed apply process is replaced by restoring an inactive apply process rather than creating a new apply process.

9. Hardware Overview

Figure 7:
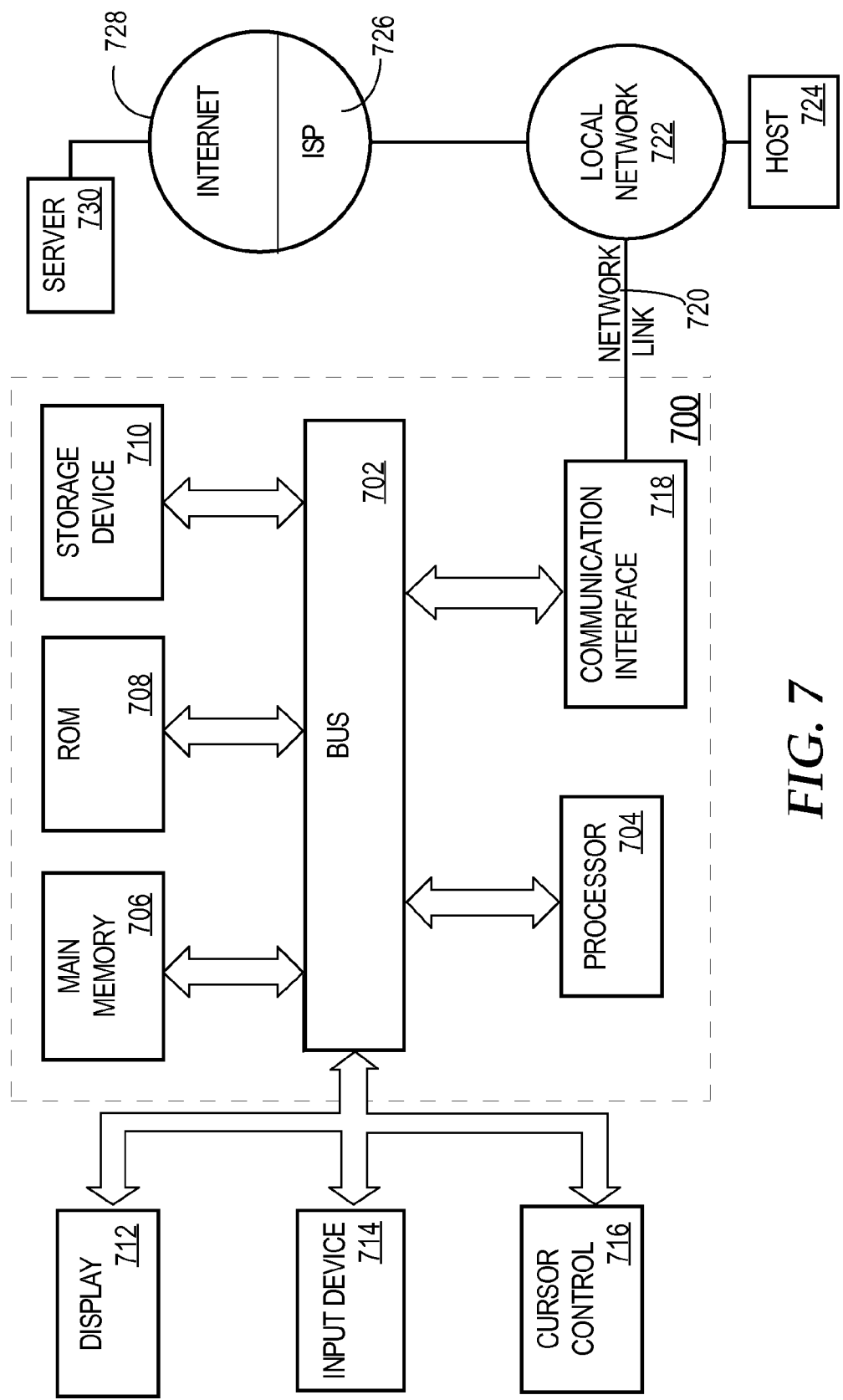
FIG. 7 illustrates a computer system upon which one or more embodiments may be implemented.

FIG. 7 illustrates a computer system upon which one or more embodiments may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

10. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    obtaining a plurality of change records;
    assigning at least one batch of change records to one or more apply processes in a set of active apply processes;
    periodically determining a first throughput value based on a number of processed change records over one or more first time intervals;
    periodically performing an increment adjustment comprising:
        adding an additional apply process to the set of active apply processes;
        determining a second throughput value based on a number of processed change records over one or more second time intervals;
        removing the additional apply process from the set of active apply processes if the second throughput value is not greater than a previous throughput value by at least an increment threshold, wherein the previous throughput value is based on a last determined first throughput value before the increment adjustment;
    periodically performing a decrement adjustment comprising:
        removing an apply process from the set of active apply processes;
        determining a third throughput value based on a number of processed change records over one or more third time intervals;
        replacing the removed apply process in the set of active apply processes if the third throughput value is not greater than the previous throughput value by at least a decrement threshold, wherein the previous throughput value is based on a last determined first throughput value before the decrement adjustment;
    wherein the method is performed by one or more computing devices.

2. The method of claim 1, wherein throughput values are determined based on a number of change records applied during a time interval.

3. The method of claim 1, wherein throughput values are determined based on a number of change records assigned during a time interval.

4. The method of claim 1, wherein the first throughput value is determined based on a mean of N throughput values determined based on a number of processed change records over each of N time intervals, where N is an integer greater than 1.

5. The method of claim 1, wherein the set of active apply processes are selected from a set of available apply processes comprising at least one inactive apply process.

6. The method of claim 1,
    wherein the increment threshold is two times a standard deviation of N intermediate throughput values for N intermediate time intervals, where N is an integer greater than 1;
    wherein the previous throughput value is a mean of the N intermediate throughput values.

7. The method of claim 1, wherein the decrement threshold is 0.

8. The method of claim 1, wherein the plurality of change records are obtained over an asynchronous stream.

9. The method of claim 1, wherein periodically performing the increment adjustment is dependent on satisfaction of an increment condition.

10. The method of claim 1, wherein periodically performing the decrement adjustment is dependent on satisfaction of a decrement condition.

11. A non-transitory computer storage medium storing instructions which, when executed by one or more processors, cause performance of:
    obtaining a plurality of change records;
    assigning at least one batch of change records to one or more apply processes in a set of active apply processes;

periodically determining a first throughput value based on a number of processed change records over one or more first time intervals;

periodically performing an increment adjustment comprising:

adding an additional apply process to the set of active apply processes;

determining a second throughput value based on a number of processed change records over one or more second time intervals;

removing the additional apply process from the set of active apply processes if the second throughput value is not greater than a previous throughput value by at least an increment threshold, wherein the previous throughput value is based on a last determined first throughput value before the increment adjustment;

periodically performing a decrement adjustment comprising:

removing an apply process from the set of active apply processes;

determining a third throughput value based on a number of processed change records over one or more third time intervals;

replacing the removed apply process in the set of active apply processes if the third throughput value is not greater than the previous throughput value by at least a decrement threshold, wherein the previous throughput value is based on a last determined first throughput value before the decrement adjustment.

12. The non-transitory computer storage medium of claim 11, wherein determining the throughput values is based on a number of change records applied during a time interval.

13. The non-transitory computer storage medium of claim 11, wherein determining the throughput values is based on a number of change records assigned during a time interval.

14. The method of claim 11, wherein determining the first throughput value is based on a mean of N throughput values determined based on a number of processed change records over each of N time intervals, where N is an integer greater than 1.

15. The non-transitory computer storage medium of claim 11, wherein the set of active apply processes are selected from a set of available apply processes comprising at least one inactive apply process.

16. The non-transitory computer storage medium of claim 11, wherein the increment threshold is two times a standard deviation of N intermediate throughput values for N intermediate time intervals, where N is an integer greater than 1;

wherein the previous throughput value is a mean of the N intermediate throughput values.

17. The non-transitory computer storage medium of claim 11, wherein the decrement threshold is 0.

18. The non-transitory computer storage medium of claim 11, wherein obtaining plurality of change records comprises obtaining the plurality of change records over an asynchronous stream.

19. The non-transitory computer storage medium of claim 11, wherein periodically performing the increment adjustment is dependent on satisfaction of an increment condition.

20. The non-transitory computer storage medium of claim 11, wherein periodically performing the decrement adjustment is dependent on satisfaction of a decrement condition.

\* \* \* \* \*

UNITED STATES PATENT AND TRADEMARK OFFICE
CERTIFICATE OF CORRECTION

| | |
|---|---|
| PATENT NO. | : 9,063,773 B2 |
| APPLICATION NO. | : 13/949594 |
| DATED | : June 23, 2015 |
| INVENTOR(S) | : Edwina Ming-Yue Lu, Nimar Singh Arora and Lik Wong |

It is certified that error appears in the above-identified patent and that said Letters Patent is hereby corrected as shown below:

Claims
Column 18:
Claim 14, line 1, delete "method" and insert --non-transitory computer storage medium--

Signed and Sealed this
Twelfth Day of April, 2016

Michelle K. Lee
*Director of the United States Patent and Trademark Office*